United States Patent

Jung et al.

[11] Patent Number: 6,002,431
[45] Date of Patent: *Dec. 14, 1999

[54] VIDEO CORRECTION APPARATUS FOR CAMCORDER

[75] Inventors: Han Jung, Seoul; Young Man Kim, Kyungki-do; Seung Pyo Hong, Kyungki-do; Ki Wong Kim, Kyungki-do; Ho Sang Park, Kyungki-do, all of Rep. of Korea

[73] Assignee: Goldstar Co., Ltd., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/742,554

[22] Filed: Oct. 28, 1996

Related U.S. Application Data

[63] Continuation of application No. 08/441,130, May 15, 1995, abandoned, which is a continuation of application No. 08/202,427, Feb. 28, 1994, abandoned.

[30] Foreign Application Priority Data

Mar. 3, 1993 [KR] Rep. of Korea .................. 93-3118

[51] Int. Cl.$^6$ ............... H04N 7/18; H04N 5/228
[52] U.S. Cl. ............ 348/208; 348/155; 348/699
[58] Field of Search ............... 348/208, 155, 348/169, 420, 699, 241, 252, 606, 625; 382/103, 278, 293; 364/516; 396/52, 54, 55; H04N 5/232, 7/18

[56] References Cited

U.S. PATENT DOCUMENTS

| | | | |
|---|---|---|---|
| 5,053,876 | 10/1991 | Blissett et al. | 348/208 |
| 5,210,559 | 5/1993 | Ohki | 354/402 |
| 5,243,418 | 9/1993 | Kuno et aal. | 348/155 |
| 5,247,586 | 9/1993 | Gobert et al. | 382/278 |
| 5,379,236 | 1/1995 | Yamamoto | 364/516 |
| 5,386,264 | 1/1995 | Sekine et al. | 354/430 |
| 5,563,652 | 10/1996 | Toba et al. | 348/209 |

FOREIGN PATENT DOCUMENTS

| | | | |
|---|---|---|---|
| 3-214975 | 9/1991 | Japan | H04N 5/232 |
| 2 218 507 | 11/1989 | United Kingdom | G06K 9/46 |

OTHER PUBLICATIONS

K. Uomori et al., Automatic Image Stabilizing System By Full–Digital Signal Processing, IEEE, pp. 510–519, Aug. 1990.

Paik et al,—An Edge Detection Approach To Digital Image Stabilization Based On Tri–State Adaptive Linear Neurons Aug. 1991.

Bliton, et al.; Microscopic Motion Analysis: Laplacian–of–Gaussian Masks for Subpixel Edge Detection; 1988, IEEE Engineering in Medicine & Biology Society $10^{th}$ Annual International Conference.

*Primary Examiner*—Wendy Garber
*Assistant Examiner*—Ngoc-Yen Vu
*Attorney, Agent, or Firm*—Jacobson, Price, Holman & Stern, PLLC

[57] ABSTRACT

A video correction apparatus for a camcorder comprising a filter for removing a noise component from digital input video data, a mask processor for calculating a difference between a pixel value of the resultant video data from the filter and each of adjacent vertical and horizontal pixel values, taking absolute values of the calculated differences and adding the taken absolute values, to detect edge data for selection of an accurate characteristic point of the video data from the filter, a representative point determination circuit for selecting a maximum value in each motion vector detection region every field in response to the edge data from the mask processor and determining positions of the selected maximum values as representative point data, and a correlation calculator for inputting the edge data from the mask processor and the representative point data from the representative point determination circuit and calculating a correlation of the inputted data in a search region of a desired range.

3 Claims, 2 Drawing Sheets

VIDEO CORRECTION APPARATUS FOR CAMCORDER

This application is a continuation of U.S. application Ser. No. 08/441,130, filed May 15, 1995, now abandoned, which is a continuation of U.S. application Ser. No. 08/202,427, filed Feb. 28, 1994, now abandoned.

BACKGROUND OF THE INVENTION

The present invention relates in general to camcorders, and more particularly to a video correction apparatus for a camcorder in which representative points are selected for calculation of a correlation in detecting a motion vector which is necessary to correction of a video shake resulting from a tremble of the user's hands.

FIG. 1 is a view illustrating conventional motion vector detection regions and representative points in each of the motion vector detection regions. As shown in this drawing, an input video is divided into 4 equal motion vector detection regions for detection of a motion vector. Each of the divided 4 equal motion vector detection regions has 30 representative points which are set in fixed and uniform positions.

FIG. 2 is a block diagram of a conventional motion vector detector. As shown in this drawing, the conventional motion vector detector comprises a filter 1 for removing noise and high frequency components from a digital input video signal. An output signal from the filter 1 is applied to a representative point memory 2 and a correlation calculator 3.

The representative point memory 2 stores 30 pixel values which are set in fixed and uniform positions of each of the 4 motion vector detection regions. Namely stored as the representative points in the representative point memory 2 are 120 pixel values of the input video of one field. The 120 representative points from the representative point memory 2 are applied to the correlation calculator 3. The correlation calculator 3 calculates correlations of the 120 representative points from the representative point memory 2 to the surrounding pixel values. A maximum correlation detector 4 is adapted to detect a maximum one of the correlations calculated by the correlation calculator 3.

However, the conventional motion vector detector has a disadvantage in that it can not sufficiently utilize video data information which can make a picture comparison accurate, because it select the representative point data in the fixed positions. Also, the representative points required in obtaining the motion vector accurately are large in number. This results in complexity in the calculation and in a construction.

SUMMARY OF THE INVENTION

Therefore, the present invention has been made in view of the above problems, and it is an object of the present invention to provide a video correction apparatus for a camcorder in which accurate representative points are selected for calculation of a correlation in detecting an accurate motion vector which is necessary to correction of a video shake resulting from a tremble of the user's hands.

It is another object of the present invention to provide a video correction apparatus for a camcorder in which a reduced number of representative points are used for calculation of a correlation in detecting an accurate motion vector which is necessary to correction of a video shake resulting from a tremble of the user's hands, so that the calculation and hardware can be simplified.

In accordance with the present invention, the above and other objects can be accomplished by a provision of a video correction apparatus for a camcorder comprising filtering means for removing a noise component from digital input video data; mask processing means for calculating a difference between a pixel value of the resultant video data from said filtering means and each of adjacent vertical and horizontal pixel values, taking absolute values of the calculated differences and adding the taken absolute values, to detect edge data for selection of an accurate characteristic point of the video data from said filtering means; representative point determination means for selecting a maximum value in each motion vector detection region for every field in response to the edge data from said mask processing means and determining positions of the selected maximum values as representative point data; and correlation calculation means for inputting the edge data from said mask processing means and the representative point data from said representative point determination means and calculating a correlation of the inputted data in a search region of a desired range.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
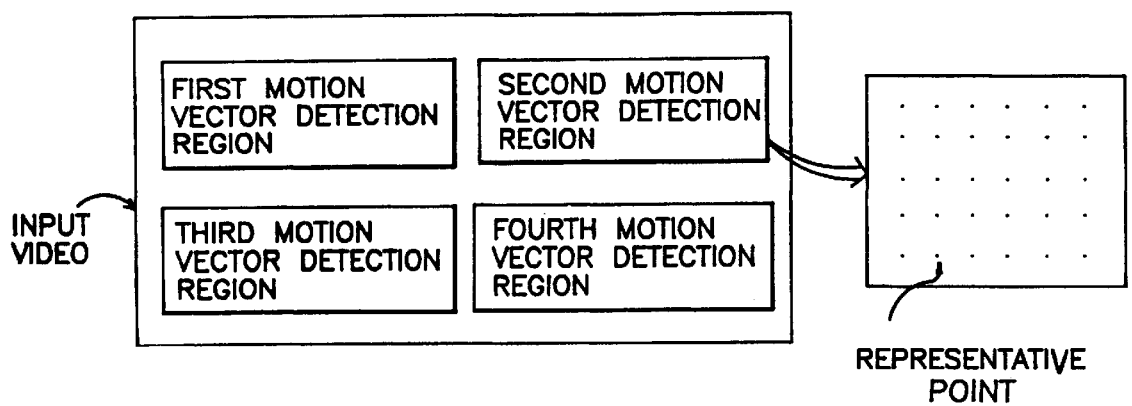
FIG. 1 is a view illustrating conventional motion vector detection regions and representative points in each of the motion vector detection regions.
Figure 2:
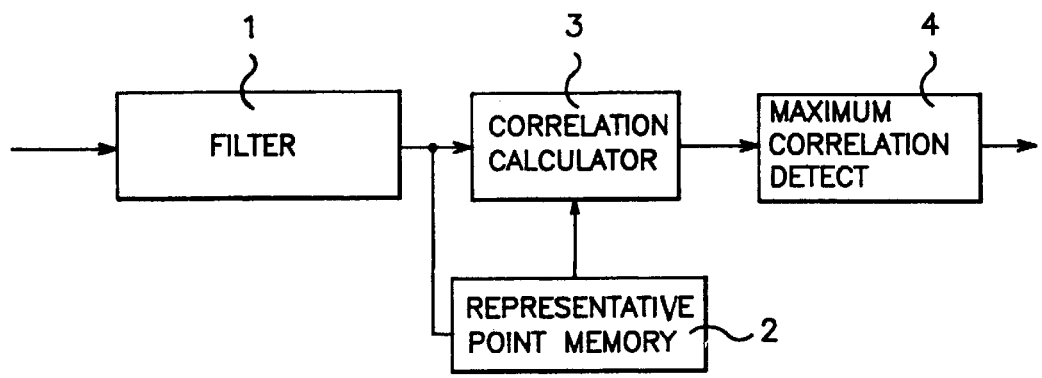
FIG. 2 is a block diagram of a conventional motion vector detector.
Figure 3:
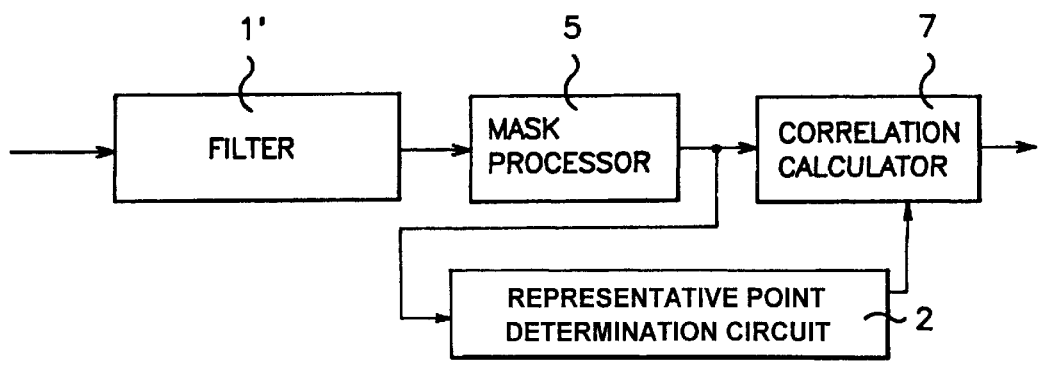
FIG. 3 is a block diagram of a motion vector detector in accordance with the present invention.

Referring to FIG. 3, there is shown a block diagram of a motion vector detector in accordance with the present invention. As shown in this drawing, the motion vector detector comprises a filter 1' for removing a noise component from digital input video data, and a mask processor 5 for calculating a difference between a pixel value of the resultant video data from the filter 1' and each of adjacent vertical and horizontal pixel values, taking absolute values of the calculated differences and adding the taken absolute values, to detect edge data for selection of an accurate characteristic point of the video data from the filter 1'.

A representative point determination circuit 6 is provided in the motion vector detector to select a maximum value in each motion vector detection region for every field in response to the edge data from the mask processor 5 and determine positions of the selected maximum values as representative point data.

A correlation calculator 7 is also provided in the motion vector detector to input the edge data from the mask processor 5 and the representative point data from the representative point determination circuit 6 and calculate a correlation of the inputted data in a search region of a desired range.

Figure 4:
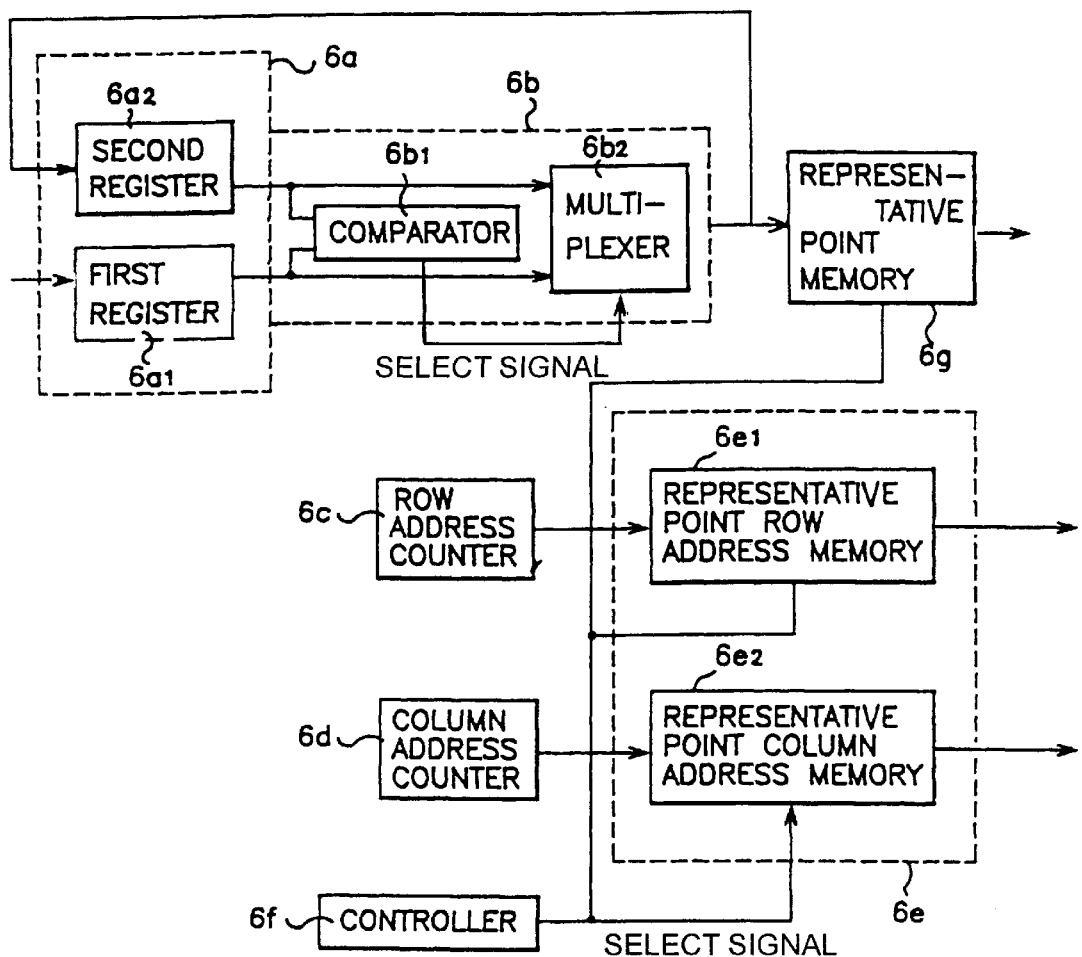
FIG. 4 is a detailed block diagram of a representative point determination circuit in the motion vector detector in FIG. 3.

Referring to FIG. 4, there is shown a detailed block diagram of the representative point determination circuit 6. As shown in this drawing, the representative point determination circuit 6 includes an edge data storage unit 6a for storing the edge data from the mask processor 5, a maximum value detector 6b for performing a comparison operation of the edge data stored in the edge data storage unit 6a to detect the maximum value in each motion vector detection region, a row address counter 6c for counting a row address, a column address counter 6d for counting a column address, and a representative point address storage unit 6e for storing the row and column addresses from the row and column address counters 6c and 6d.

The representative point address storage unit 6e includes a representative point row address memory 6e1 for storing the row address from the row address counter 6c and a representative point column address memory 6e2 for storing the column address from the column address counter 6d.

Also, the representative point determination circuit 6 includes a controller 6f for performing a system control operation to select the representative point data of the addresses stored in the representative point address storage unit 6e, and a representative point memory 6g for storing the maximum values from the maximum value detector 6b as the representative point data of the motion vector detection regions in response to a select signal from the controller 6f, respectively.

The edge data storage unit 6a includes first and second registers 6a1 and 6a2 for storing the edge data from the mask processor 5.

The maximum value detector 6b includes a comparator 6b1 for comparing the edge data stored in the first and second registers 6a1 and 6a2 in the edge data storage unit 6a with each other and a multiplexer 6b2 for selecting a larger value of the edge data stored in the first and second registers 6a1 and 6a2 in response to an output signal from the comparator 6b1 and feeding back the selected data to the second register 6a2.

The operation of the motion vector detector with the above-mentioned construction in accordance with the present invention will hereinafter be described in detail.

First, the digital input video data is noise-removed by the filter 1' and then applied to the mask processor 5.

The mask processor 5 performs a specified masking operation for selection of the accurate characteristic point of the video data from the filter 1'. Namely, to detect the edge data of the video data from the filter 1', the mask processor 5 calculates the difference between the pixel value of the video data from the filter 1' and each of the adjacent vertical and horizontal pixel values, takes the absolute values of the calculated differences and adds the taken absolute values, as shown by the following equation:

$$\begin{bmatrix} P(i-1, j-1) & P(i, j-1) & P(i+1, j-1) \\ P(i-1, j) & P(i, j) & P(i+1, j) \\ P(i-1, j+1) & P(i, j+1) & P(i+1, j+1) \end{bmatrix}$$

$$G(i, j) = |P(i, j) - P(i, j-1)| + |P(i, j) - P(i-1, j)| + |P(i, j) - P(i+1, j)| + |P(i, j) - P(i, j+1)|$$

where, P(i,j): a gray level of each pixel and G(i,j): a variation (edge data) of P(i,j) with respect to the adjacent pixels.

The edge data determined in the above manner is applied to the correlation calculator 7 and the representative point determination circuit 6.

Figure 5A:
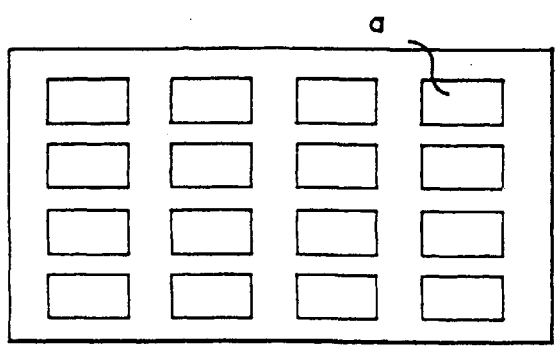
FIG. 5A is a view illustrating motion vector detection regions in accordance with the present invention.

Now, the operation of the representative point determination circuit 6 will hereinafter be described in detail with reference to FIG. 4 and FIGS. 5A and 5B. FIG. 5A is a view illustrating the motion vector detection regions in accordance with the present invention and FIG. 5B is a view illustrating the representative point data in each motion vector detection region in FIG. 5A.

First, the edge data from the mask processor 5 is temporarily stored in the first register 6a1 and then compared with the initial value stored in the second register 6a2 by the comparator 6b1. The multiplexer 6b2 selects a larger one of the values stored in the first and second registers 6a1 and 6a2 in response to the output signal from the comparator 6b1 and feeds back the selected data to the second register 6a2. The comparison operation of the values in the first and second registers 6a1 and 6a2 is repeatedly performed with respect to 16 motion vector detection regions as shown in FIG. 5A. With the above operation repeated, the maximum values from the maximum value detector 6b are stored in the representative point memory 6g, respectively, as the representative point data of the motion vector detection regions in response to the select signal from the controller 6f. Also, the positions of the representative point data are calculated by the row and column address counters and then stored in the representative point address storage unit 6e.

Figure 5B:
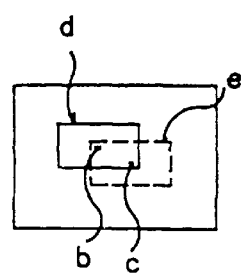
FIG. 5B is a view illustrating representative point data in each motion vector detection region in FIG. 5A.

Then, the correlation calculator 7 calculates the correlation of the representative point data in the search region of the desired range as shown in FIG. 5B with respect to the motion vector detection regions a as shown in FIG. 5A.

As seen from FIG. 5A, the input video is partitioned into the motion vector detection regions of 4×4 blocks of fixed sizes at a desired interval, from each of which the representative point is extracted.

In FIG. 5B, a value (the representative point of a certain motion vector detection region) with a largest edge value is shown to be obtained in a certain position b in the case where no motion of the video is present. In the case where a video shake is present, a value (a new representative point of the same motion vector detection region) with the largest edge value is shown to be obtained in a certain position c. Here, the reference numerals d and e designate existing and new search regions, respectively.

On the other hand, when a certain motion is simultaneously present in the motion vector detection regions, the positions of the maximum values are moved in the motion vector detection regions, thereby causing new representative points to be selected. Namely, the maximum values are selected in the motion detection regions for every field and the positions thereof are determined as the representative points for the motion vector detection.

As apparent from the above description, according to the present invention, the reduced number of representative points are used for the calculation of the correlation in detecting the accurate motion vector which is necessary to the correction of the shaky video. This has the effect of simplifying the calculation and construction. The representative points of the maximum values are selected for the accurate calculation of the correlation every field. Therefore, the motion vector detection can be performed more accurately. Also, besides the camcorder, the present invention may be applied to any other video processing systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video correction apparatus for a camcorder, comprising:

filtering means for removing a noise component from video data and outputting filtered video data;

mask processing means for detecting an edge data value of each pixel in a field of the filtered video data outputted from the filtering means;

representative point determination means for selecting a maximum edge data value among edge data values of all pixels in each motion vector detection region which is disposed at a predetermined interval in every field and determining a position of the selected maximum edge data value as a representative point of each motion vector detection region wherein the representative point determination means comprises:

edge data storage means for storing the edge data values from the mask processing means;

maximum edge data value detection means for performing a comparison operation of the edge data value stored in the edge data storage means to detect the maximum edge data value in each motion vector detection region;

an address counter for counting addresses;

representative point address storage means for storing the addresses counted by the address counter as a representative point address;

control means for performing a system control operation to select the representative point addresses stored in the representative point address storage means in each motion vector detection region; and a representative point memory for storing the maximum edge data values from the maximum edge data value detection means as the representative point data of the motion vector detection region in response to a select signal from the control means, respectively; and correlation calculation means for calculating a position correlation between successive fields at each representative point in the motion vector detection regions of every field.

2. A video correction apparatus for a camcorder as set forth in claim 1, wherein the mask processing means calculates differences between a pixel data value of the filtered video data outputted from said filtering means and respective adjacent vertical and horizontal pixel data values, takes absolute values of the calculated differences, and adds the absolute values to detect the edge data values.

3. A video correction apparatus for a camcorder as set forth in claim 2, wherein each of the pixel data values represents a gray level of the video data.

* * * * *